Figure 1:
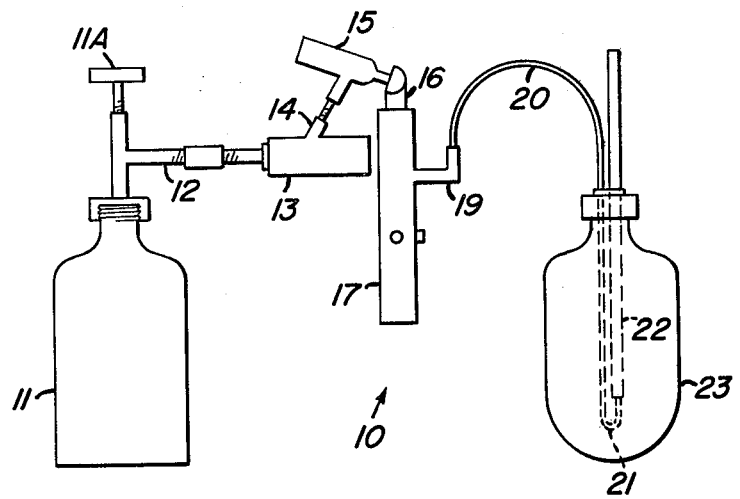
Figure 2:
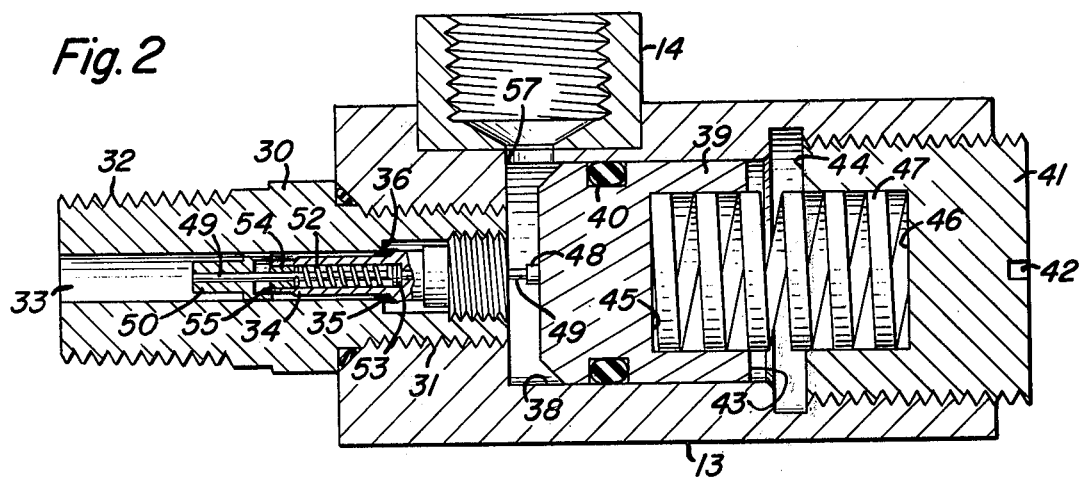
Figure 3:
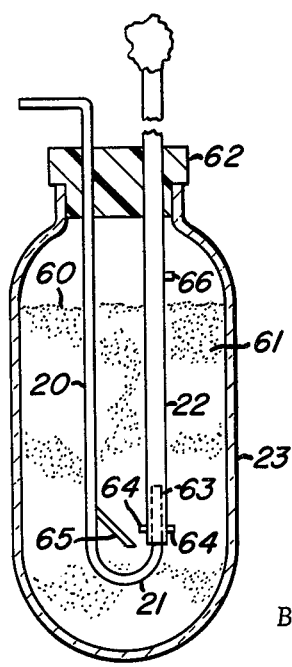

United States Patent [19]
Cramer

[11] 3,938,705
[45] Feb. 17, 1976

[54] ASPIRATING SYSTEM

[76] Inventor: Thomas P. Cramer, 508 Culler Ave., Frederick, Md. 21701

[22] Filed: Oct. 23, 1969

[21] Appl. No.: 869,453

[52] U.S. Cl. ............................................... 222/59
[51] Int. Cl.² .......................................... B67D 5/08
[58] Field of Search ........... 222/52, 59, 447; 291/3; 102/75; 137/505.13, 505, 538; 92/30; 251/636; 302/17, 26, 35

[56] References Cited
UNITED STATES PATENTS

| 818,411 | 4/1906 | Bush | 137/538 |
|---|---|---|---|
| 1,797,898 | 3/1931 | Cook | 291/3 |
| 1,929,719 | 10/1933 | Werder | 222/59 |
| 2,081,239 | 5/1937 | Klopfenstein | 92/30 |
| 2,097,852 | 11/1937 | Wright et al. | 291/3 |
| 2,120,034 | 6/1938 | Myers | 102/25 |
| 3,041,970 | 7/1962 | Foster | 102/25 |
| 3,053,273 | 9/1962 | Schreiner | 137/505.13 |
| 3,375,032 | 3/1968 | Frantz | 291/3 |

FOREIGN PATENTS OR APPLICATIONS

| 530,834 | 10/1921 | France | 92/30 |
|---|---|---|---|

Primary Examiner—Samuel Feinberg
Attorney, Agent, or Firm—Nathan Edelberg; Robert P. Gibson; A. Victor Erkkila

[57] ABSTRACT

A system for delivering venturi aspirated dry powder at a predetermined rate in which one end of an exhaust tube is embedded in a vessel of dry powder and a pressure gas inlet tube has a return bend portion smaller than and extending into the embedded exhaust tube end. A miniature flow regulator is employed to normally deliver controlled pressure gas to the aspirator inlet, wherein delivered gas pressure increases as the gas pressure supply decreases. The regulator has a gas source passage containing a normally slightly opened valve whose stem is held in such slightly open valve position by an adjustably biased piston which allows the valve to close when a predetermined amount of pressure gas has built up on the regulator outlet side of the valve. There is provision for incorporation of a piston pulser intermediate the regulator and the aspirator, wherein an accumulator develops predetermined gas pressures to reciprocate a spring loaded piston valve between open and closed positions, permitting delivery of pressure gas surges to the aspirator.

1 Claim, 6 Drawing Figures

INVENTOR,
Thomas P. Cramer

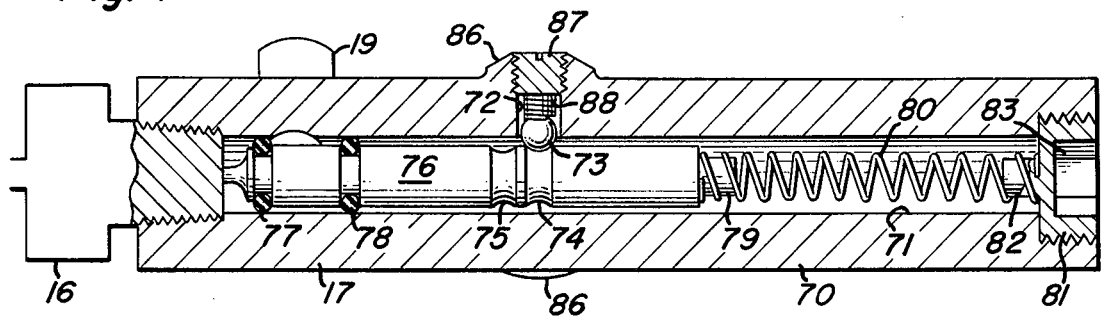
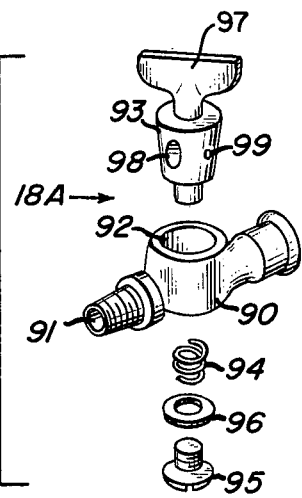
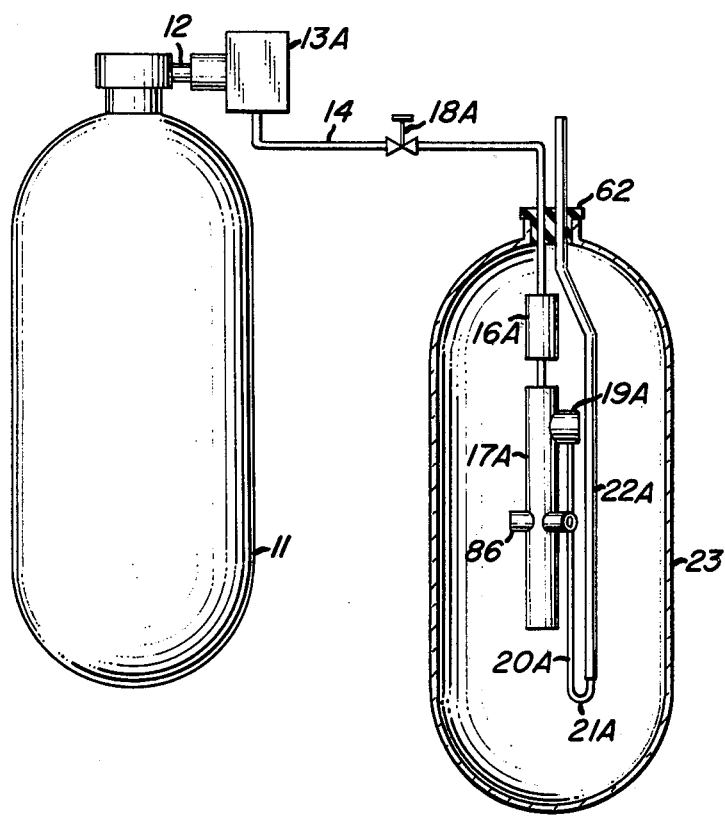
INVENTOR,
Thomas P. Cramer

ASPIRATING SYSTEM

The invention described herein may be manufactured, used, and licensed by or for the Government for governmental purposes without the payment to me of any royalty thereon.

The invention relates to an improved system for delivering aspirated dry powder.

The control of dried material flow in a gas dissemination generator has been a major problem due to several factors including the receding level of material inside the container as the contents are disseminated, with the resultant reduction in container pressure as the void increases, thereby preventing a smooth or manageable flow of dry material which would require a gradual increase in disseminating pressure or energy.

It is an object of the invention to provide a dry powder disseminating system in which the material can be effectively and desirably delivered at a substantially constant rate.

Another object of the invention is to provide such a system in which prior unfavorable slugging of large amounts of material through the exhaust tube has been eliminated.

These and other objects, features and advantages will become more apparent from the following description and accompanying drawings in which:

FIG. 1 is a schematic view of a preferred dissemination system embodying the principles of the invention.

FIG. 2 is an enlarged sectional view of the miniature regulator in the FIG. 1 arrangement.

FIG. 3 is an enlarged sectional view of the aspirator structure in the FIG. 1 arrangement.

FIG. 4 is an enlarged sectional view of the piston pulser in the FIG. 1 arrangement.

FIG. 5 is a modified arrangement of a similar dissemination system.

FIG. 6 is an exploded view of a valve employed in the FIG. 5 arrangement.

The disseminating system for delivering dry powder, shown generally at 10 (FIG. 1) preferably includes a closed vessel 11 of high pressure nitrogen gas, initially compressed to a pressure of approximately 1800 psig., which is valved at 11A and in fluid communication through conduit 12 to a miniature flow regulator 13. The exit port 14 is fluid connected to an accumulator 16 of piston pulser 17 through an appropriate T-shaped coupling 15. The pulser outlet 19 has connected thereto one end of aspirator inlet conduit 20. The other end of inlet tube 20 has a return bend portion 21 which enters one end of the relatively larger aspirator exhaust tube 22 at a location well embedded in dry powder contained in the vessel 23.

In the FIG. 5 modification, the high pressure nitrogen gas vessel is conduited at 12 to a regulator 13A, which is identical with regulator 13 and regulator discharge line 14, containing valve 18A (FIGS. 5, 6) is connected with an accumulator 16A which leads to piston pulser 17A. The aspirator exhaust tube 22A has one end receiving the return bend portion 21A of relatively smaller tube 20A that is connected with pulser outlet 19A.

The miniature flow regulator 13 (FIGS. 1, 2) has one end thereof tapped and chamfered to securely and sealingly receive an appropriately threaded end 31 and O-ring thereon of a valve body 30 whose other end 32 is suitably threaded for attachment such as by coupling with the high pressure nitrogen gas supply. The body central passage 33 is counterbored and tapped at end 31 for securely mounting valve member 34 with its peripheral seal 35 properly engaging the annular seat 36 defined by the counterbore.

The main cavity or chamber is defined by annular wall 38 in which is slidably mounted an internally biased piston 39 carrying a peripheral O-ring seal 40. The other end of the regulator body 13 is internally threaded to receive an adjusting cap or plug 41 whose external face is slotted at 42 to facilitate adjustment thereof. The facing or opposed surfaces 43 and 44 of the piston 39 and adjusting screw 41 each contain a central recess 45, 46 of substantial size and depth to seat respective end portions of an intermediate heavy spring 47 which biases piston 39 against the enlarged protruding head 48 of valve stem 49, tending to unseat the slidable valve cap member 50 which is integral with or otherwise suitably connected to the stem 49.

A compression spring 52 surrounds the stem 49 between an integral stem flange 53 and a bushing 54 preferably press-fitted within the neck interior of the valve member seat 55 so that the spring 52 tends to urge the valve cap 50 towards its seat 55. The relationship between the valve cap 50 and the body central passage 33 is such that the high pressure fluid supply passage 33 is normally in fluid communication with the exit port 14. The relationship between the valve member 34 and its slidable stem is such that sufficient clearance is provided to enable passage of pressure gas therethrough and into the cavity about the stem head 48 when the cap 50 is slightly unseated. Thus, the effect of the spring biased piston 39, as adjusted by screw 41, upon the stem 49 is such as to initially slightly overcome the respective forces of the spring 52 and supply pressure gas upon the stem 49 and valve cap 50 to thereby slightly unseat the valve cap 50. When the desired or predetermined gas pressure has built up in the cavity adjacent the chamfered piston head and lateral exit port 57 for delivery through exit member 14 which is internally threaded for appropriate conduit connection, the cavity gas pressure will tend to act against the biased piston 39 and permit the valve cap 50 to close. Exit member 14 may be soldered to the regulator body or plastic injection molded consistant with the desired design. Thus, as the supply gas pressure is diminished, the regulator 13 will still deliver gas at a predetermined or even increased pressure. It has been observed that when the supply pressure drops to 1000 psig., the pressure of gas exiting through port 14 has increased from 50 psig. to approximately 65 psig., and at an adjusted screw position from 70 psig. to 85 psig. This has advantageous use when employed with a dry material disseminator 23 (FIGS. 1, 3) when an increase in energy or pressure gas is required for continued operation particularly when the amount or level of dry material decreases and produces a reduced container pressure.

While in the preferred system of FIG. 1 a piston pulser 17 (FIGS. 1, 4) and its associated elements are connected intermediate the regulator exit port 14 and the aspirator inlet tube 20, the latter tube 20 may be connected directly to port 14.

The aspirator vessel 23, filled to a substantial level 60 with a dry powder material 61 which is to be disseminated or delivered through aspirator exhaust tube 22, has an appropriately apertured stopper 62 to accommodate tubes 20 and 22. Preferably, the inlet tube return bend portion 21 terminates in a jet nozzle 63 that is positioned well into the entrance of tube 22 to form a venturi effect in the jetted gas picking up or drawing therewith particles of dry material. The lower end of the exhaust tube 22 also has a plurality of lateral extending inlet ports 64, 64 for permitting maximum dry powder flow, and escape port 66 located above level 60 prevents spill over. Additionally, inlet tube 20 has a small powder bed agitating branch 65 leading to the area of the venturi to provide an even distribution of dry powder and thus eliminate any unfavorable slugging thereof.

The piston pulser 17 of the FIG. 1 arrangement, as well as the piston pulser 17A in the FIG. 5 modification in which its location is within the aspirator vessel, preferably has a hollow housing 70, with the central substantially cylindrical bore 71 intersecting a lateral passage leading to exit port 19 as well as a plurality of circumferentially spaced lateral passages 72. Preferably, three passages 72 are employed at 120° spacings and each passage contains a spring biased adjustable ball detent 73. Balls 73 as a group engage alternately one of the longitudinally spaced but adjacent annular grooves 74, 75 formed on the periphery of the pulsing piston 76 substantially at its mid-length, the piston 76 being slidably mounted in passage 71 for longitudinal movement between the groove engaging ball positions. One end of piston 76 adjacent accumulator 16 carries a pair of longitudinally spaced O-rings 77, 78 that sealingly engage passage wall 71 to prevent fluid passing beyond O-ring 78. The other end of piston 76 has a reduced extension or cylindrical protruberance 79 that extends into one end of an elongated compression spring 80, the other spring end being mounted over a similar cylindrical protruberance 82 of a threaded adjustable end cap 81. The exposed surface of end cap 81 is provided with a hexagonal recess 83 or screw driver slot for accommodating an appropriate wrench to adjust the spring bias force normally tending to maintain the piston 76 in its position (shown in FIG. 4) with O-ring 77 preventing fluid passing of nitrogen pressure gas into exit port 19 until the accumulator 16 has developed sufficient gas pressure upon the one end of piston 76 to overcome its opposing spring force and snap the piston toward the end cap 83. Such piston movement will result in a ball detents 73 thus engaging piston open groove 75 and O-ring 77 being retracted or withdrawn from its port obstructing position. When the pressure in the area between the accumulator 16 and exit port 19 is sufficiently reduced by downstream usage thereof in a surging manner, the overpowering force of spring 80 as predeterminedly adjusted will return the piston 76 to its FIG. 5 position. Adjacent each lateral opening 72 the housing 70 is provided with a strengthened portion 86 which is counterbored and tapped for reception of a set screw 87 in alignment with the corresponding opening 72. Each screw 87 exerts a considerable laterally inward force via its compression spring 88 upon ball detent 73 to assure alternate detent locking in the piston grooves.

The venturi aspirator can be used separately in its own container or jointly with either or both the pusler and regulator in somewhat larger containers. The regulator-aspirator combination will provide a continuous aspirated flow, and when the snap piston pulsing mechanism is used, the flow will be pulsed at predetermined frequencies.

The valve structure 18A (FIGS. 5, 6) includes a valve body 90 with a through passage 91 intersecting a substantially larger transverse passage 92 in which a rotary type valve plug member 93 and its associated compression spring 94, set screw 95 and gasket 96 are mounted. The wing-type handle 97 facilitates depressing and rotation of valve 93 to place a selected one of the diametrically intersecting transverse passages 98, 99 in registry with passage 91. When the large port 98 is selected, a substantially continuous operation may be obtained, and when the miniature port 99 (approximately 0.006 in. dia.) is used a pronounced pulsing operation is accomplished.

I wish it to be understood that I do not desire to be limited to the exact details of construction shown and described, for obvious modifications will occur to a person skilled in the art.

I claim:

1. A system for delivering aspirated dry powder at a constant rate operated by high pressure fluid comprising:

a venturi aspirator containing a predetermined quantity of dry powder, an exhaust tube with one end embedded in said dry powder and its other end extending outside of said aspirator, and a pressure fluid inlet tube provided with a return bend portion smaller than and extending into said exhaust tube one end, a miniature flow regulator having a body with an exit port in fluid communication with said aspirator inlet tube, a high pressure fluid supply passage normally in fluid communication with said exit port, and an internally and longitudinally biased piston slidably mounted in said body so that said piston is normally in fluid communication with said passage, said piston being directly responsive to the pressure of said high pressure fluid, a normally opened valve member sealingly secured in said passage and having a valve stem longitudinally slidably with clearance in said valve member, said stem having one end portion secured to a cap which is capable of seating against one end of said valve member, the other end portion of said stem extending through the other end of said valve member and being in abutment with said piston, a spring interposed between said valve member and stem and tending to close said cap against said valve member one end in opposition to said biased piston, whereby said cap continuously alternates between an unseated, open position and a seated, closed position in direct dependence upon the pressure of said high pressure fluid and force of said spring overcoming the biasing force of said biased piston, to continuously regulate the flow of said high pressure fluid to said exit port depending on the predetermined biasing force of said biased piston, and a piston pulsing unit interposed between said regulator and said aspirator, said unit having a body with a central passage and a lateral exit port in fluid communication with said central passage and said aspirator inlet tube, an accumulator secured to one end of said pulsing body adjacent said lateral port and in fluid communication with said regulator exit port, an elongated piston member slidably mounted in said central passage, one end of said piston member having longitudinally spaced peripheral seals with one of the seals being movable to and from a position intermediate said accumulator and lateral port, longitudinally spaced but adjacent peripheral grooves in said piston member, a spring biased ball detent located in a lateral recess provided in said unit body and alternately engageable in said grooves, and means biasing said piston member toward said accumulator in opposition to fluid delivered from said accumulator.

* * * * *